United States Patent [19]

Yamauchi

[11] Patent Number: 5,029,230
[45] Date of Patent: Jul. 2, 1991

[54] MOTOR CONTROL APPARATUS AND SPEED SETTING APPARATUS

[75] Inventor: Satomi Yamauchi, Nagoya, Japan

[73] Assignee: Mitsubishi Denki Kaibushiki, Japan

[21] Appl. No.: 391,032

[22] Filed: Aug. 9, 1989

[30] Foreign Application Priority Data

Aug. 16, 1988 [JP] Japan .................................. 63-202632

[51] Int. Cl.⁵ ............................................. H02P 5/00
[52] U.S. Cl. ..................... 388/828; 388/827; 388/904
[58] Field of Search .................... 361/90-92, 361/30-31; 388/825-827, 828-829, 830-833, 904, 801-802, 806-807, 809-810, 815; 364/148-149, 150-151, 180, 181

[56] References Cited

U.S. PATENT DOCUMENTS

| | | | |
|---|---|---|---|
| 3,800,198 | 3/1974 | Graf et al. | 361/90 X |
| 4,084,406 | 1/1976 | Brenneman | 318/798 X |
| 4,346,307 | 8/1982 | Zulaski | 361/90 X |
| 4,368,499 | 1/1983 | Stifter | 361/90 |
| 4,514,665 | 4/1985 | Melocik et al. | 361/90 X |
| 4,541,029 | 9/1985 | Ohyama | 361/90 X |
| 4,571,690 | 2/1986 | Munetsugu | 361/90 X |
| 4,734,628 | 3/1988 | Bench | 388/817 |
| 4,780,656 | 10/1988 | Mitchell | 361/90 X |
| 4,918,395 | 11/1983 | Inagaki | 361/90 X |

FOREIGN PATENT DOCUMENTS 57-97118   6/1982  Japan .
57-206284  12/1982 Japan .
57-208881  12/1982 Japan .
59-136093  8/1984  Japan .
60-87689   5/1985  Japan .

Primary Examiner—William M. Shoop, Jr.
Assistant Examiner—David Martin
Attorney, Agent, or Firm—Leydig, Voit & Mayer

[57] ABSTRACT

A motor control apparatus for a sewing machine includes an adjustable speed setter for generating a speed set signal. A first memory stores a plurality of reference values each defining a reference region into which the speed set signal can fall. A second memory stores speed setpoint values corresponding to the reference regions. A central processing unit selects one of the reference regions by comparing the speed set signal with the reference values and selects the corresponding speed setpoint value from the second memory. A motor is controlled to run at the selected speed setpoint value.

7 Claims, 8 Drawing Sheets

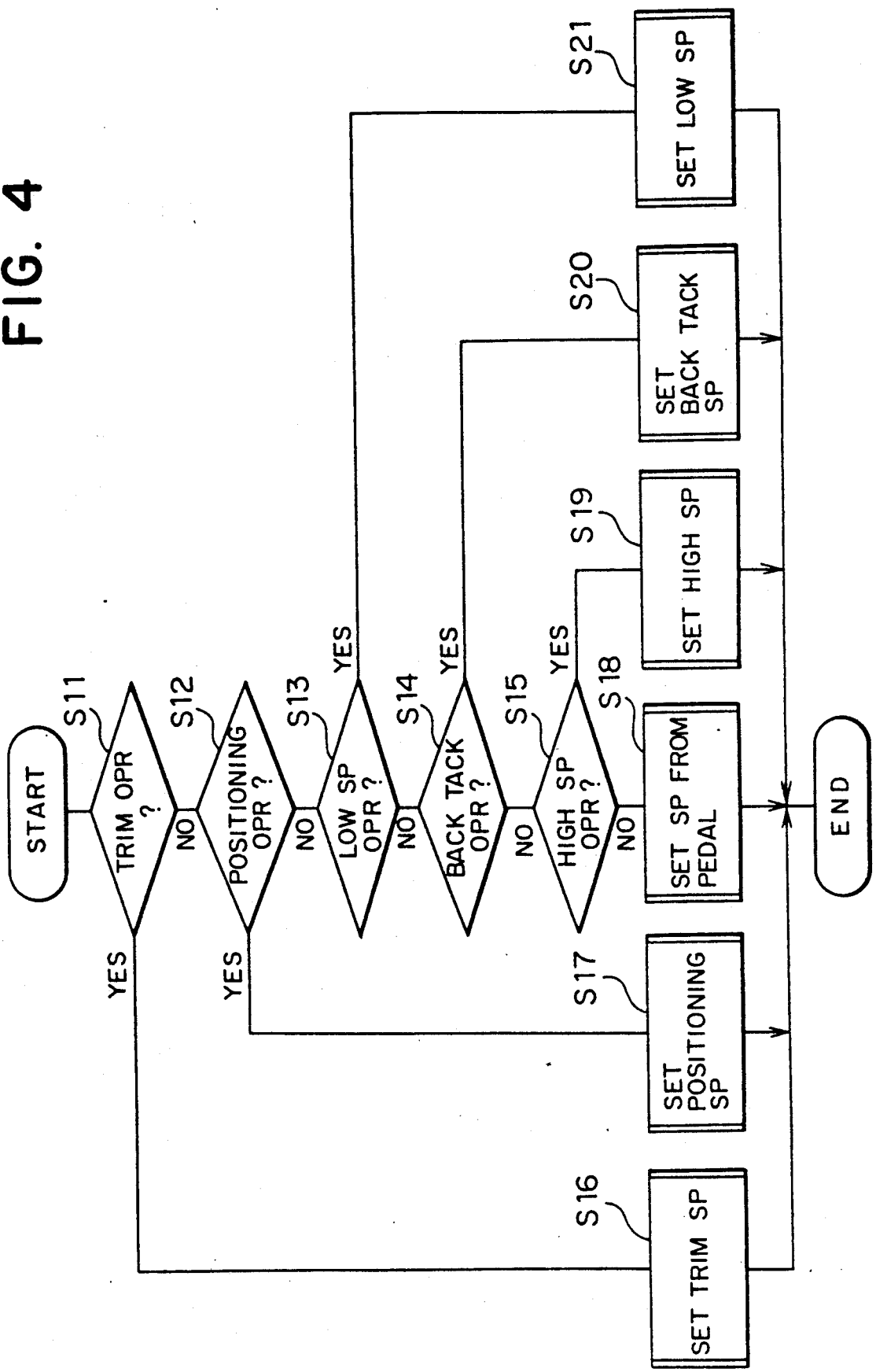

FIG. 5

| MODEL OF SEWING MACH | SETPOINT NUM OF REV (spm) | | | | |
|---|---|---|---|---|---|
| | HIGH SP | BACK TACK SP | LOW SP | TRIMMING | POSITIONING |
| A | 4000 | 1700 | 250 | 200 | 250 |
| B | 3000 | 1200 | 250 | 200 | 250 |
| C | 2000 | 700 | 250 | 175 | 250 |
| D | 3700 | 1400 | 250 | 175 | 250 |
| E | 3000 | 1400 | 250 | 175 | 250 |
| F | 3000 | 1400 | 250 | 175 | 250 |

MOTOR CONTROL APPARATUS AND SPEED SETTING APPARATUS

BACKGROUND OF THE INVENTION

The present invention relates to a motor control apparatus for controlling the speed of a motor and, particularly, for setting the speed of the motor.

FIG. 6 is a circuit diagram of a conventional motor control apparatus disclosed in, for example, Japanese Patent Laid-Open No. 87689/1985, and FIG. 7 is a diagram showing a conventional circuit for setting the speed of a sewing machine disclosed in, for example, Japanese Patent Laid-Open No. 136093/1984.

In FIGS. 6 and 7, reference numeral 21 denotes a commercial power source, 22 denodes a converter for converting the commercial power source into DC electric power, and 23 denotes an inverter which inverts the DC electric power converted through the converter back to AC electric power of a desired frequency. Reference numeral 24 denotes an electric motor, 25 denotes an encoder for detecting the speed or position of the motor, and 26 denotes a waveform shaping unit for shaping the waveform of pulse signals from the encoder 25.

Reference numeral 27 denotes a speed detector circuit which detects the speed of the motor upon receiving signals from the waveform shaping unit 26, reference numeral 28 denotes a speed feedback signal, and 29 denotes a speed instruction signal that is set by and produced from a speed setting circuit of FIG. 7.

Reference numeral 30 denotes a motor control apparatus, 31 denotes a variable resistor for setting a high speed shown in FIG. 7, and reference numeral 32 denotes a variable resistor for setting a low speed shown in FIG. 7.

The conventional motor control apparatus is constituted as described above. The operation will now be described in conjunction with FIGS. 6 and 7.

Referring to FIG. 6, when the power source 21 is connected to the main circuit unit of the motor control apparatus 30, the electric power causes the motor 24 to rotate passing through the converter 22 and inverter 23 in the main circuit unit. The encoder 25 coupled to the motor 24 sends to the waveform shaping unit 26 the pulse signals of a number proportional to the rotational angle of the motor. The waveform shaping unit 26 which has received the pulse signals determines the forward rotation or the reverse rotation, shapes the waveform, and sends signals to the speed detector circuit 27. Upon receipt of the signals, the speed detector circuit 27 produces a speed feedback signal 28 for the motor 24.

The speed instruction signal 29 of FIG. 6 is obtained from the speed setting circuit of FIG. 7. By setting the variable resistor 31 or 32 of FIG. 7, the speed instruction signals 29 of a frequency corresponding to the speed are sent to the motor control apparatus 30. Upon receipt of speed instruction signals 29, the motor control apparatus 30 compares the speed instruction signals 29 with the speed feedback signals 28, and so controls the motor 24 that its number of revolutions becomes in agreement with the speed instruction signals 29.

FIG. 8 is a diagram which schematically illustrates a conventional motor control apparatus equipped with an A/D converter disclosed in, for example, Japanese Patent Laid-Open No. 97118/1982, Japanese Patent Laid-Open No. 206284/1982 and Japanese Patent Laid-Open No. 208881/1982, and FIG. 9 is a diagram of characteristics representing the speed of a motor corresponding to the voltage obtained through a variable resistor.

In FIG. 8, reference numeral 41 denotes a commercial power source, 42 denotes a motor, and 43 denotes an encoder for detecting the speed or position of the motor.

Reference numeral 44 denotes a speed feedback signal, 45 denotes a speed instruction signal, and 46 denotes a variable resistor for setting a high speed.

Reference numeral 47 denotes a variable resistor for setting a low speed, 48 denotes a motor control apparatus, and 49 denotes a first A/D converter which converts an analog quantity from the variable resistor 46 into a digital quantity.

Reference numeral 50 denotes a second A/D converter which converts an analog quantity from the variable resistor 47 into a digital quantity, and 51 denotes a switch.

The conventional motor control apparatus is constituted as described above. When the power source 41 is connected, the electric power causes the motor 42 to rotate passing through the main circuit unit in the motor control apparatus 48.

To set the speed of the motor 42, the speed instruction voltage obtained by the setting of the variable resistor 46 or 47 is applied to the first A/D converter 49 or the second A/D converter 50 in the motor control apparatus 48. The first A/D converter 49 or the second A/D converter 50 receives the speed instruction voltage and converts it into a digital quantity. The speed instruction voltage converted into a digital quantity is selected by a switch 51 and is produced as a speed instruction signal 45. The motor control apparatus 48 compares the speed instruction signal 45 with a speed feedback signal 44 from the encoder 43 that is coupled to the motor 42, and so controls the motor 42 that its number of revolutions comes into agreement with the speed instruction signal 45.

When the speed is to be set using the above-mentioned conventional motor control apparatus, the variable resistor must be manipulated while measuring the number of revolutions of the motor using a tachometer or the like. Therefore, the speed is set requiring extended periods of time and resulting in an increase in the cost.

SUMMARY OF THE INVENTION

The present invention was accomplished to solve the above-mentioned problems and its object is to provide a motor control apparatus which enables the time for setting the variable resistor to be shortened such that the cost can be decreased.

The motor control apparatus according to the present invention comprises a setter for setting a speed instruction voltage for giving a speed instruction signal to the motor, an A/D converter for converting the speed instruction voltage into a digital quantity, first storage means storing a reference voltage of either a first reference voltage region covering a range of, for example, from 0 V to a first reference voltage V1 or a second reference voltage region covering a range of from a second reference voltage V2 which is greater than the first reference voltage V1 to a maximum voltage (the first or the second reference voltage region is hereinafter simply referred to as "reference voltage region"), and second storage means storing a speed setpoint value corresponding to the reference voltage region.

The apparatus is further equipped with a central processing unit which compares the speed instruction voltage input via the A/D converter with said references voltage, which determines whether the speed instruction voltage lies in the reference voltage region of the first storage means, and which, when the speed instruction voltage lies in the reference voltage region of the first storage means, reads the corresponding speed setpoint value from the second storage means and produces it as a speed instruction signal.

In the present invention, the central processing unit that has received the speed instruction voltage converted into a digital quantity reads a reference voltage stored in the first storage means and determines whether it lies in the reference voltage region. When the speed instruction voltage lies in the reference voltage region, the central processing unit reads from the second storage means a speed setpoint value that corresponds to the reference voltage region, and produces it as a speed instruction signal to control the speed of the motor.

BRIEF DESCRIPTION OF THE DRAWINGS

FIGS. 3 and 4 are diagrams of characteristics showing relationships between the reference voltage region and the speed setpoint value that represents a number of revolutions of the motor;

FIG. 5 is a flow chart illustrating means for switching the speed setpoint values;

In the drawings, the same reference numerals represent the same or corresponding portions.

DESCRIPTION OF THE PREFERRED EMBODIMENTS

Figure 1:
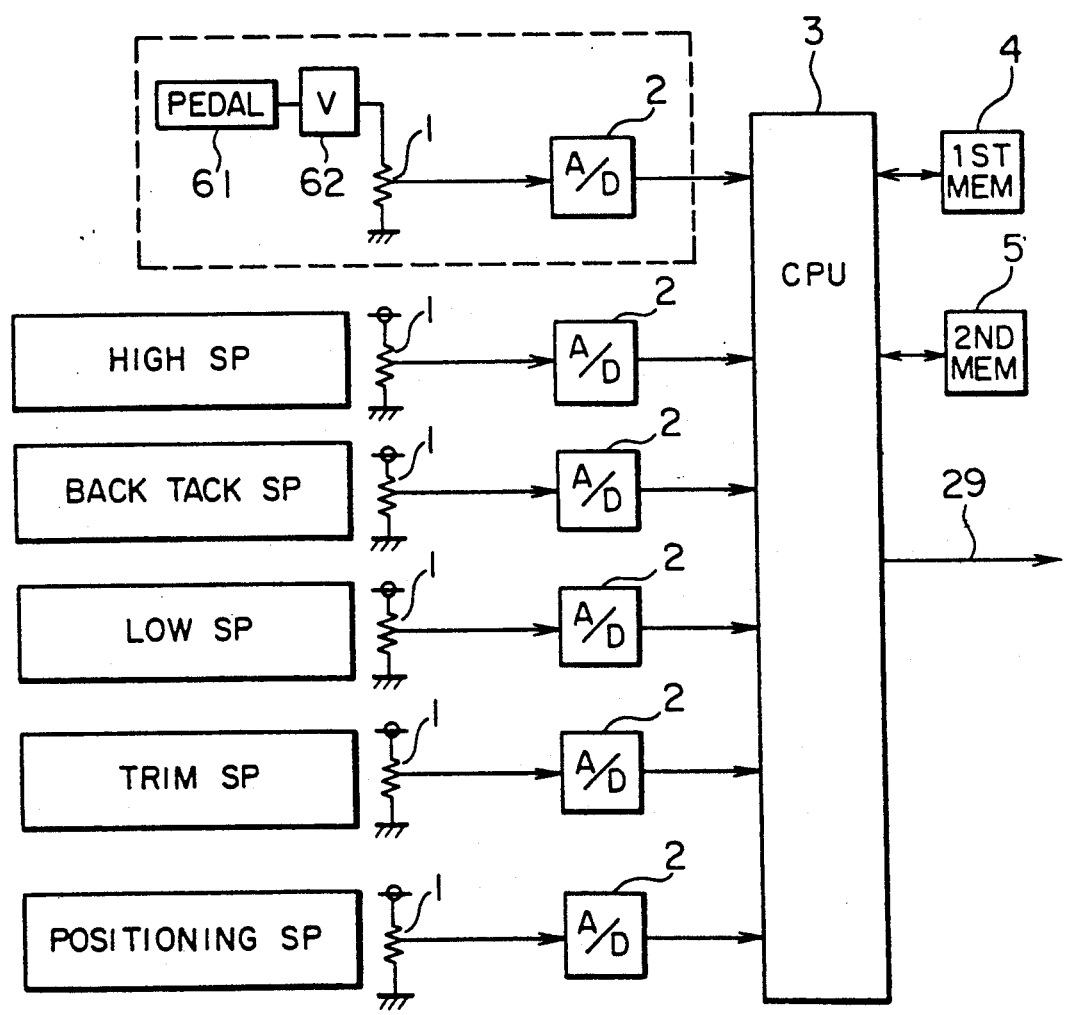
FIG. 1 is a block diagram illustrating the constitution of a control apparatus according to an embodiment of the present invention.
Figure 2:
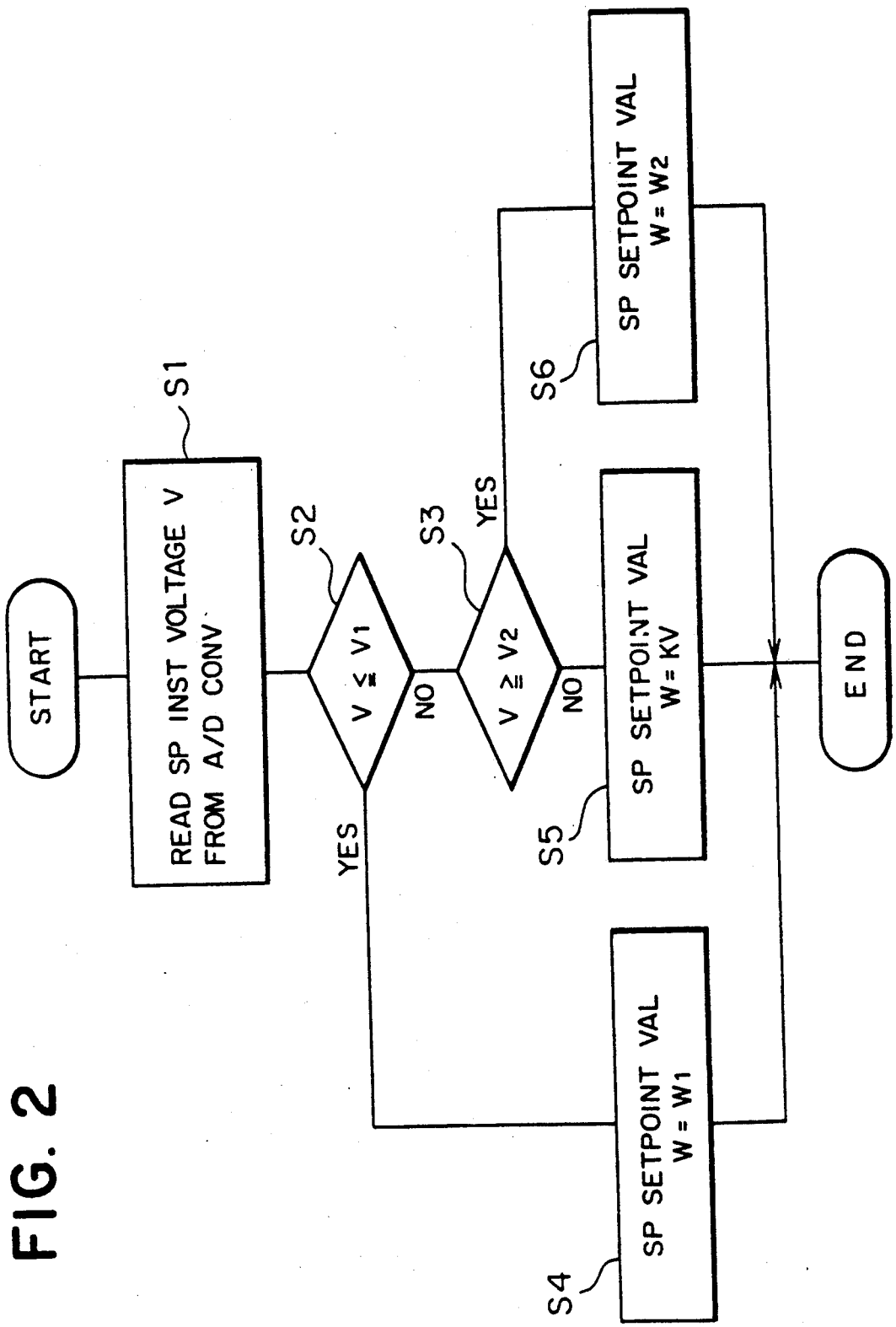
FIG. 2 is a flow chart which illustrates the operation of the control apparatus.
Figure 3A:
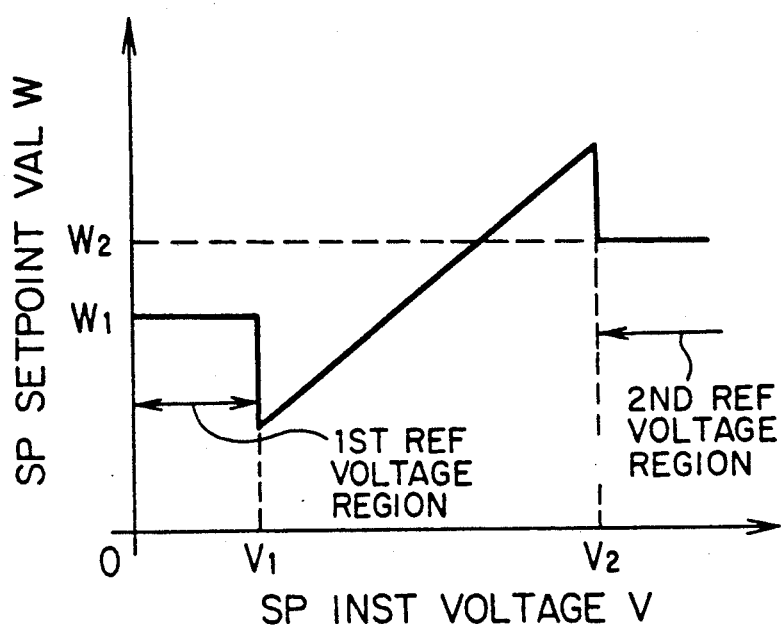

FIG. 1 is a block diagram showing the constitution of a control apparatus for controlling the speeds of, for example, a sawing machine set at the time of shipment according to an embodiment of the present invention, FIG. 2 is a flow chart which illustrates the operation of the above-mentioned control apparatus, and FIG. 3(a) is a diagram of characteristics showing a relationship between the speed setpoint value W and the reference voltage region that is set for a speed instruction voltage V according to an embodiment of the present invention.

In FIG. 1, reference numeral 1 denotes setters for setting the speed, and 2 denotes A/D converters for converting analog quantities into digital quantities. In this embodiment, the setters 1 have five speeds, i.e., "high speed", "back tack speed", "low speed", "trim speed" and "positioning speed".

Reference numeral 3 denotes a central processing unit, 4 denotes first storage means which stores a reference voltage of a reference voltage region corresponding to a speed instruction voltage, and 5 denotes second storage means which stores a speed setpoint value corresponding to the reference voltage region.

The portion surrounded by a broken line is a speed instruction system for obtaining any speed by treading the pedal, and wherein reference numeral 61 denotes a pedal and 62 denotes a voltage that varies depending upon the treading amount of the pedal.

Operation of the thus constituted control apparatus will now be described in conjunction with a flow chart of FIG. 2.

The "high speed" can be divided into two of, for example, 2000 spm and 4000 spm depending on the model of the sewing machine. Described below is the case of setting the "high speed" of 2000 spm.

When the "high speed" setter 1 is moved to the extreme left side, the speed instruction voltage V becomes 0 V. The speed instruction voltage V is sent to the A/D converter 2 and is then read by the central processing unit 3 (S1) which also reads from the first memory means (4) a first reference voltage V1 having a maximum value (e.g., 5 V) in the first reference voltage region, and compares the speed instruction voltage V with the first reference voltage V1 (S2). Here, since the speed instruction voltage V is 0 V, a speed setpoint value (W=2000 spm) corresponding thereto is read from the second storage means (5) and is sent as a speed instruction signal W1 to a motor speed control apparatus 30 (S4). The "high speed" is thus set.

Described below is the case where the "high speed" of 4000 spm is to be set. As the "high speed" setter 1 is moved to the extreme right side, the speed instruction voltage V becomes, for example, 16 V. The speed instruction voltage V is sent to the A/D converter 2 and is read by the central processing unit 3 (S1) which also reads from the first memory means 4 the first reference voltage V1 having a maximum value (5 V) of the first reference voltage region, and compares the speed instruction voltage V with the first reference voltage V1 (S2). Here, since the speed instruction voltage V is 16 V, the program proceeds to a step (S3) where a second reference voltage V2 having a minimum value (e.g., 12 V) of the second reference voltage region is read from the first storage means (4) and is compared with the speed instruction voltage V. Here, the speed instruction voltage V is 16 V, and a speed setpoint value (W=4000 spm) corresponding thereto is read from the second storage means 5 and is sent as a speed instruction signal W2 to the motor speed control apparatus 30 (S6). The "high speed" is thus set.

The two sewing machines having the "high speed" of 2000 spm or 4000 spm are further set in regard to their other speeds (back tack speed, low speed, trim speed and positioning speed) in the same manner as the one described above, and are shipped.

When the speed instruction voltage V is greater than the first reference voltage V1 but is smaller than the second reference voltage V2, the speed setpoint value W is obtained by multiplying the speed instruction voltage V by a predetermined value K, enabling the speed to be set continuously.

When the sewing machine is of the model having two "high speeds" of 2000 spm and 4000 spm, the speed instruction signal of 2000 spm is obtained when the "high speed" setter 1 is moved to the extreme left side and the speed instruction signal of 4000 spm is obtained when it is moved to the extreme right side according to the present invention.

Though the above-mentioned embodiment has employed five setters 1, it is of course allowable to use any number of the setters 1.

Figure 3B:
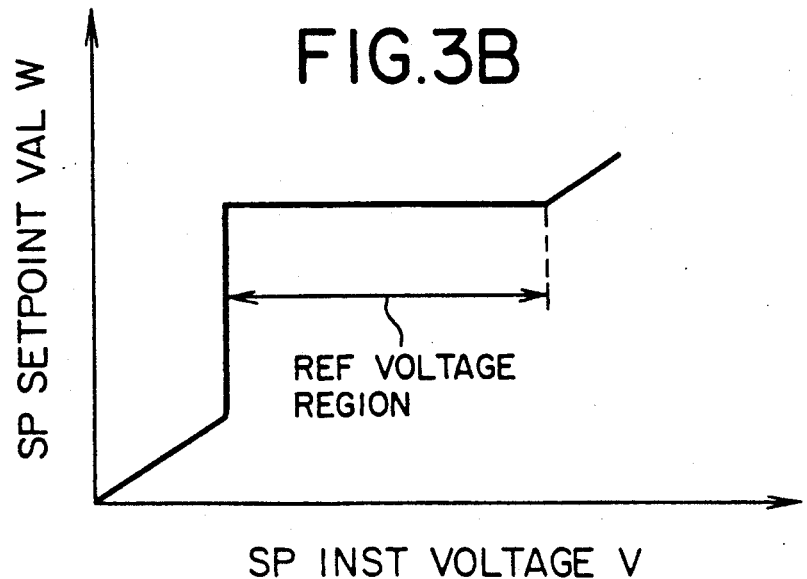
Figure 6:
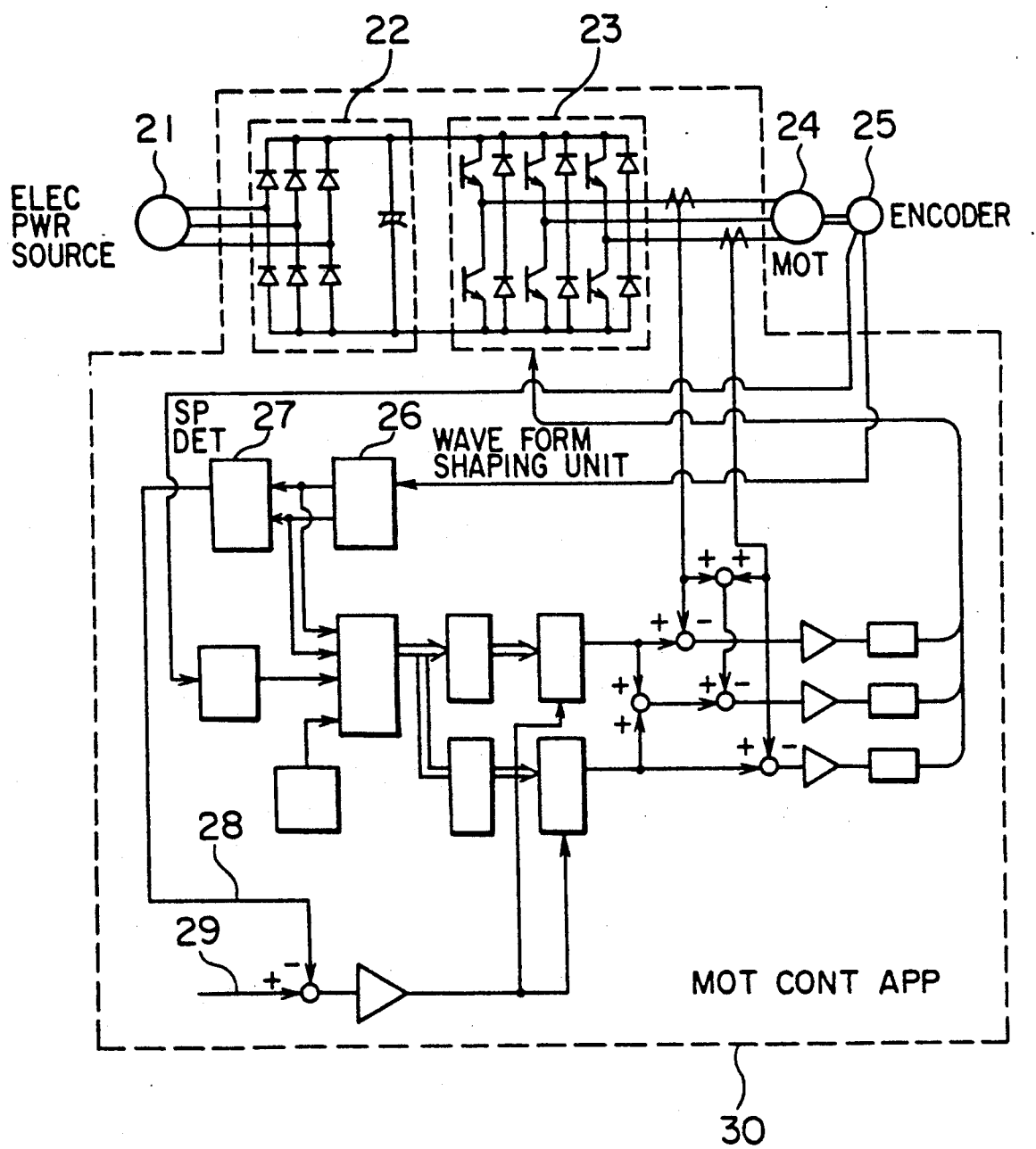
FIG. 6 is a circuit diagram of a conventional synchronous motor control apparatus.
Figure 7:
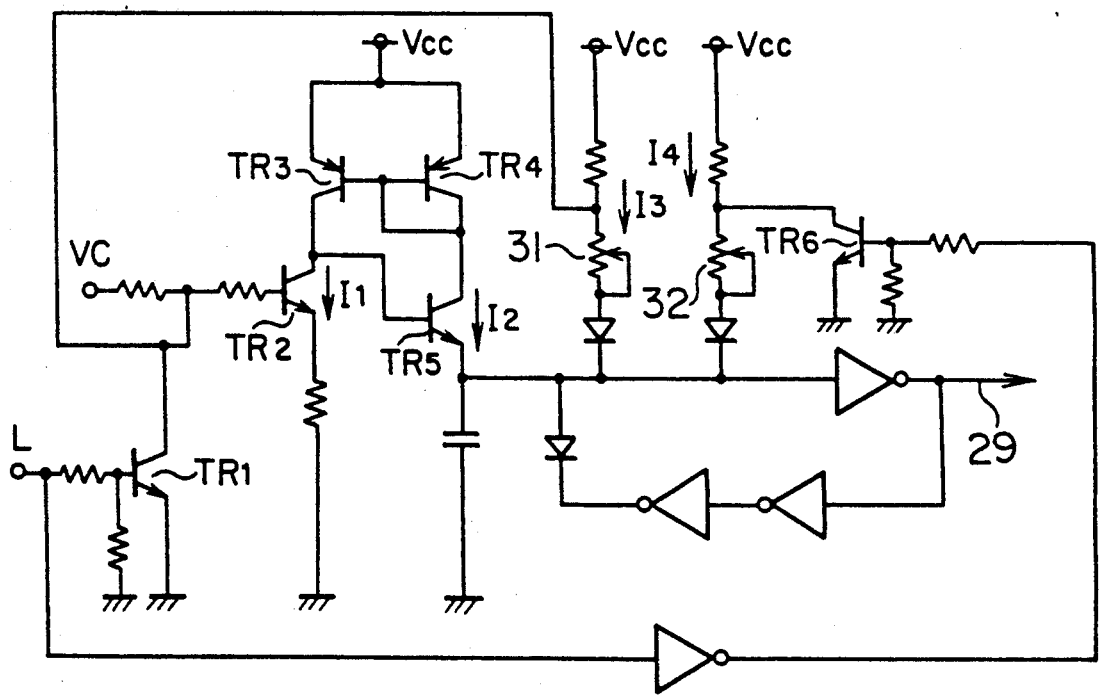
FIG. 7 is a circuit diagram showing a conventional speed setting circuit for a sawing machine.
Figure 8:
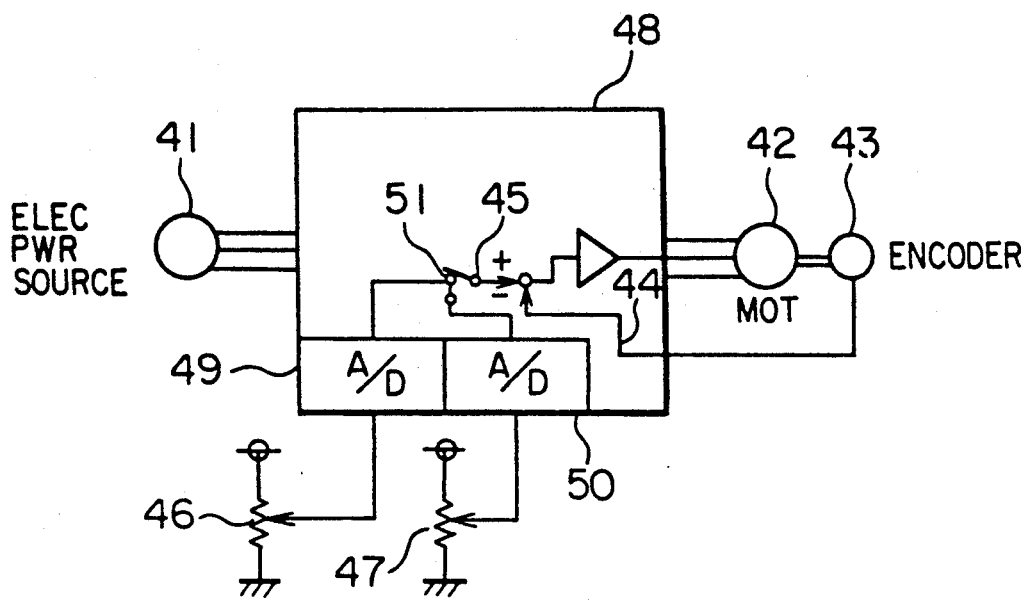
FIG. 8 is a diagram which schematically illustrates a conventional motor control apparatus equipped with an A/D converter.
Figure 9:
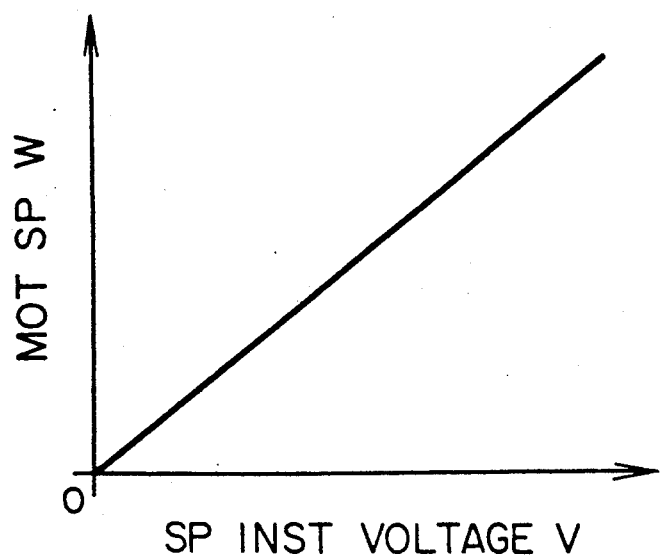
FIG. 9 is a diagram of conventional characteristics representing the speed of the motor corresponding to a voltage obtained through a variable resistor.

Further, though the description has dealt with the case of the first reference voltage region and the second reference voltage region set to correspond to the speed instruction voltages, it is further allowable to set only one reference voltage region as shown in FIG. 3(b) to meet the speed instruction voltage.

When the setting range is greater than the first reference voltage V1 but is smaller than the second reference voltage V2, the speed setpoint value W was described to vary in proportion with the speed instruction voltage. However, the speed setpoint value W needs not necessary vary in proportion therewith but may vary according to, for example, a primary function or a secondary function, or may be set to a predetermined value between W1 and W2.

In the above-mentioned embodiment, a variable resistor was used as a setter which, however, may be replaced by any other counterpart provided it is capable of continuously setting the signals. In addition to being set continuously, the control operation is effected while changing the signals into digital signals through the A/D converter. Therefore, the speed is set maintaining high resolution and cheaply yet contributing to improving reliability.

When the motor control apparatus and the speed setting apparatus are used for the sewing machine, many setters are used in a switched manner.

The switching means is explained in a flow chart of FIG. 4.

First, it is determined whether the trim operation is being carried out or not (S11). When the trim operation is being carried out, the speed therefor is set (S16). When it is not, it is determined whether the positioning operation is being carried out or not (S12).

When it is, the positioning speed is set. When it is not, it is then determined whether the low-speed operation is being carried out or not (S21).

Thus, determination is carried out successively to determine whether the back tack operation is being carried out or not (S14) or whether the high-speed operation is being carried out or not (S15).

The setpoint values of the speeds (S16 to S21) shown in FIG. 4 vary depending upon the model of the sewing machine. When the table and the motor are to be used in combination but the sewing machine only is to be changed accompanying the change in the material that is to be sewn, it becomes necessary to change the number of revolutions of the motor.

In such a case, the setter may be so set that the speed instruction voltage lies in the reference voltage region.

The setpoint speeds (S16 to S21) of FIG. 4 can be easily adjusted using means of FIG. 2.

FIG. 5 shows relationships between the models of the sewing machines and the setpoint numbers of revolutions.

If the setpoint numbers of revolutions are all stored in the control apparatus and in the speed setting apparatus, the setters need be adjusted only roughly such that the speed instruction voltage lies in the reference voltage region in order to obtain a predetermined speed instruction signal.

Therefore, the control apparatus of one type only is required and there is no need of replacing the parts or setting the speeds consuming time.

The setting of an intermediate speed between, for example, the speeds V1 and V2 is changed continuously when a fine adjustment is required such as when the seams of back tack operation do not match or when the material to be sewn changes from a thin material to a thick material.

Though in the foregoing was described the case where the speed was set based on the voltage, it is also allowable to set the voltage based on the current, pulses or encoded pulse sequences.

According to the present invention as described above, the setters are so set that the speed instruction setpoint signals lie within a predetermined reference setpoint signal region in order to obtain predetermined speed instruction signals. Therefore, the setting time is reduced and the cost decreases.

What is claimed is:

1. A motor control apparatus for a sewing machine having a motor operable in a plurality of speed ranges comprising:

range selecting means for selecting a speed range of a motor;

a plurality of adjustable speed setters, each corresponding to one of the speed ranges, for generating a speed set signal indicating the desired speed of the motor in the corresponding speed range;

a first memory for storing a plurality of reference values, each reference value identifying a reference region for the speed set signal of one of the speed setters;

a second memory for storing a plurality of speed setpoint values, each setpoint value corresponding to one of the reference regions;

region selecting means for selecting one of the reference regions by comparing the speed set signal of the speed setter for the selected speed range with the reference values in the first memory; and speed selecting means for selecting from the second memory a speed setpoint value corresponding to the selected reference region and for generating a speed instruction signal for the motor indicative of the selected speed setpoint value.

2. An apparatus as claimed in claim 1 wherein each of the speed setters comprises a potentiometer and an analog-to-digital converter for converting the output of the potentiometer into a digital speed set signal.

3. An apparatus as claimed in claim 1 wherein the range selecting means comprises:

a depressible pedal;

means for generating a pedal depression signal corresponding to the amount of depression of the pedal; and means for selecting a speed range based on the pedal depression signal.

4. An apparatus as claimed in claim 1 wherein:

the region selecting means comprises means for selecting a first reference region when the speed set signal is smaller than a first reference value, a second reference region when the speed set signal is larger than a second reference value, and a third reference region when the speed set signal is between the first and second reference values; and the speed selecting means comprises means for selecting a first constant speed setpoint value when the first reference region is selected, a second constant speed setpoint value when the second reference region is selected, and a variable speed setpoint value proportional to the speed set signal of the speed setter for the selected speed range when the third reference region is selected.

5. An apparatus as claimed in claim 1 wherein:

the region selecting means comprises means for selecting a first reference region when the speed set signal is smaller than a first reference value, a second reference region when the speed set signal is larger than a second reference value, and a third reference region when the speed set signal is between the first and second reference values; and the speed selecting means comprises means for selecting a first speed setpoint value when the first reference region is selected by the region selecting means, a second speed setpoint value when the second reference region is selected, and a third speed setpoint value when the third reference region is selected, wherein the first and second variable speed setpoint values are proportional to the speed set signal of the speed setter for the selected speed range and the third speed setpoint value is constant.

6. A motor control apparatus for a motor operable in a plurality of operating modes comprising:

mode selecting means for selecting an operating mode of a motor;

an adjustable speed setter for generating a speed set signal indicating a desired speed of the motor in the selected operating mode;

a first memory for storing a reference value corresponding to a reference region for the speed set signal;

a second memory for storing a speed setpoint value corresponding to the reference region;

region determining means for determining if the speed set signal falls into the reference region by comparing the speed set signal with the reference value; and an instruction signal generator for selecting from the second memory the speed setpoint value corresponding to the reference region when the region determining means determines that the speed set signal falls into the reference region and for generating a speed instruction signal for the motor indicative of the speed setpoint value.

7. A motor control apparatus for a sewing machine having a motor operable in a plurality of speed ranges comprising:

a pedal;

means for generating a pedal depression signal corresponding to the amount of depression of the pedal;

a plurality of adjustable speed setters, each corresponding to a particular motor speed range, for generating a speed set voltage;

a first memory for storing a plurality of reference values, each reference value defining a limit of a voltage region for the speed set voltage of one of the speed setters;

a second memory for storing a plurality of speed setpoint values, each set point corresponding to one of the voltage regions and indicating the speed of the motor when the speed set voltage falls in the corresponding voltage region; and a central processing unit comprising speed range selecting means for selecting a speed range of the motor based on the pedal depression signal, region selecting means for comparing the speed set voltage of the speed setter corresponding to the selected speed range with one of the reference values in the first memory and for selecting a voltage region, and speed setpoint selecting means for selecting from the second memory a speed setpoint value corresponding to the selected voltage region and for generating a speed instruction signal for the motor indicative of the selected speed setpoint value.

* * * * *